Patented Dec. 29, 1953

2,664,365

UNITED STATES PATENT OFFICE 2,664,365

METHOD FOR PRINTING PIGMENT COLORS ON GLASS FABRICS

Fred G. La Piana, North Eastham, Mass., and George N. Houth, Cranston, R. I., assignors to Stein, Hall & Company, Inc., New York, N. Y., a corporation of New York No Drawing. Application May 19, 1950, Serial No. 163,092

4 Claims. (Cl. 117—126)

The present invention relates to an improved printing paste suitable for use in printing pigment colors on textile materials and to a method of applying to textile materials color pigments carried by the printing paste of this invention. The use of the printing paste and method of this invention is particularly advantageous for printing pigment colors on glass fibers.

It is well known in the textile printing art that pigment colors are ordinarily printed on textile materials by the use of a printing paste consisting essentially of a pigment binder and a thickener. Pigmentary colors, as distinguished from dyes, are generally inert and fast to degradation agents such as sunlight and air as well as to common chemicals such as washing powders and the like to which textile materials are subjected in laundering and dry cleaning. Pigments have a high covering power and are relatively inexpensive to produce. Consequently many efforts have been made to apply them to textile fabrics, and particularly to glass fibers, in such a manner that the fabrics colored thereby will have light fastness, washing and cleaning characteristics comparable to those colored with soluble dyes.

Pigment binders hitherto proposed have included thermoplastic materials and thermosetting resins. More recently, latex type pigment binders have been described in United States Patent No. 2,511,113, granted June 13, 1950, on our copending application, Serial No. 748,664, filed May 16, 1947. The pigment binders disclosed in this patent comprise three essential components, namely an aqueous dispersion of a resin selected from the group consisting of vinyl chloride polymers, vinylidene chloride polymers and vinyl-vinylidene chloride copolymers, an unvulcanized latex comprising a synthetic rubbery polymer of a butadiene hydrocarbon and a water-soluble thermo-setting urea formaldehyde containing resin. The use of these latex-type pigment binders in printing pastes is accompanied by a number of significant advantages. It does not render a printed fabric sticky when ironed, as does the use of thermoplastic binders; does not give the printed fabric a stiff hand, as does the use of thermo-setting resin-type binders; and results in improved color fastness and resistance to crocking.

The first of the three essential components in the latex-type pigment binder comprises about 10 to 50% by weight of the pigment binder and contains from a few to about 60% by weight of the specified resins in a solid dispersed form. The dispersed resin is in the form of discrete spherical particles that have a negative charge. The size of the individual spherical particles is preferably of the order of 0.1 micron in diameter. The dispersing medium is water, and small quantities of stabilizing agents are preferably also present to insure good colloidal stability. The concentration of solids in the dispersion may vary from a few percent up to a concentration of from 55% to 60%. At or near the upper limit of this concentration the viscosity increases very rapidly with concentration, and for this reason only concentrations higher than 60% are not practicable.

The second of these components comprises from about 5 to 40% by weight of the pigment binder. It acts as a plasticizer and contains from about 30 to 70% by weight of solids. One unvulcanized synthetic rubber latex that is particularly useful is a copolymer of butadiene and styrene, wherein the relative proportion is 25% to 75% of butadiene and 75% to 25% of styrene by weight. Others are copolymers of acrylonitrile with butadiene and of isoprene with isobutylene. These blends of resinous synthetic rubber latex combine in various degrees sunlight resistance, ozone resistance and solvent resistance and have thermosetting properties. The rubber does not require vulcanization for the purpose intended in this invention. In fact, vulcanization is not desirable, since it tends to make the film hard and brittle. One advantage of this solid plasticizer over the usual liquid plasticizers is that it remains in the compound under certain severe conditions under which the liquid plasticizers would eventually dissipate or leach out.

The third component of the pigment binder described in the aforementioned patent is a water-soluble thermosetting resin comprising from about 5 to 25% by weight of the binder. It may me a urea formaldehyde resin or, more advantageously, a water-soluble protein-alkylolamine urea-formaldehyde reaction product such as is described in United States Patent No. 2,262,771.

To help set the resin and harden the other components, give the pigment binder a pH within the range of 9 to 11, eliminate the tendency of pigment particles to stick in the engraving, and lubricate the printing color, the pigment binder described may also contain up to about 15% by weight of excess free formaldehyde, up to about 10% of ammonia or an amine such as triethanolamine, up to about 10% by weight of a heavy mineral oil such as that available under the name "Bayol" and up to about 15% by weight of light mineral oil such as that generally known in the trade as "Mineral Spirits."

The thickener components conventionally used in printing pastes for applying pigments colors to textile materials include such materials as locust bean gum, British gum, starch and the like. Combinations of such thickeners with the latex-type pigment binders particularly described produce results that are excellent for most commercial purposes even on glass fibers, which are ordinarily more difficult to print. It has been found, however, that there is some loss of color when fabrics printed with such compositions are subjected to repeated laundering. This is believed to be due to a retention, in the film of water-soluble thickener, of a small percentage of the pigment and to the washing out, upon repeated laundering, of that small percentage together with the water-soluble thickener.

The present invention is addressed specifically to the solution of this problem, particularly to its occurrence with pigment printed glass fibers.

It has now been found that superior results can be obtained by utilizing a printing paste wherein the thickener is a water-soluble salt of alginic acid. The printing is carried out in the conventional manner with this printing paste and, after being thoroughly dried, is after-treated with an aqueous solution of a water-soluble compound of a metal which forms a water-insoluble compound with alginic acid. This after-treatment insolubilizes the film formed by the thickening agent and thereby imprisons the pigment particles carried by the thickener to render the pigment entirely wash resistant.

Water-soluble salts of alginic acid suitable as thickeners in the printing paste of this invention include, for example, sodium-, potassium-, ammonium- and magnesium-alginates, as well as salts formed by the reaction of alginic acid with an organic base such as triethanolamine.

Metals which form water-insoluble alginates include bivalent metals other than magnesium and trivalent metals, e. g. barium, beryllium, copper, zinc, nickel, chromium and aluminum. The metal compounds preferred particularly in the method of this invention are chromic acid, chromic acetate and aluminum subacetate.

Although the relative proportions in the printing paste of pigment binder and thickener may vary widely depending upon the requirements of a particular operation, it has been found that best results are obtained when the thickener comprises between about 50 and 85% by weight of the paste, the balance of 15 to 50% being essentially pigment binder. It is to be understood, of course, that additional materials such as plasticizing, penetrating and lubricating agents may also be included.

The method of this invention is operable, and produces excellent results when used with printing pastes containing conventional pigment binders such as thermosetting resins and thermoplastic materials in that loss of color pigment from the printed fabric due to washing out of the thickener component is avoided. For optimum results, however, i. e., to obtain colored fabrics having a good hand and showing no stickiness when ironed, the method of the invention is preferably carried out with printing pastes having the latex-type pigment binders described more particularly herein.

The printing paste and method of this invention is believed to be unique, particularly because of the success obtained in printing glass fibers, although it is to be understood that equally good results are obtained with other textile fabrics. Surprisingly enough, it has been found that excellent results have been obtained even with silicone-treated glass fibers for which no successful color printing method is believed to have been developed heretofore.

The method of this invention is carried out by printing on a glass fabric or other textile material a printing paste containing the desired pigment and consisting essentially of from 15 to 50% by weight of pigment binder, preferably of the type heretofore described in detail, and 85% to 50% by weight of a dilute solution of a water-soluble alginate. If desired, the printing paste may contain a small proportion, i. e. of the order of 1 to 5% by weight of a penetrant such as that available on the market under the trade name "Tergitol #7," which is believed to have the chemical formula $$C_4H_9CH(C_2H_5)C_2H_4CH(SO_4Na)C_2H_4CH(C_2H_5)_2$$

to increase penetration into the glass fiber, or glass fibers may be pretreated with a cationic agent. After application of the printing paste to the material by conventional methods, the printed material is thoroughly dried, e. g. for two to three minutes at temperatures up to about 300° F., and then passed through a bath of water-insolubilizing agent to form a water-insoluble alginate, the time of immersion in the bath being of the order of 10 to 20 seconds. Following the after-treatment, the material is dried. If desired, the dried material may be subjected to a soap scouring and again frame-dried.

The utility and advantages of the invention will become further apparent from the following examples which are included for illustrative purposes only and are not intended to limit the scope of the invention.

Example 1

37 parts by weight of a pigment binder consisting of 32.5% by weight of vinyl chloride latex in the form of a water dispersion containing about 60% by weight of solids, 32.5% by weight of a synthetic rubber latex in the form of a water dispersion containing about 33 to 36% by weight of solids believed to be a copolymer of butadiene and styrene prepared by copolymerizing one mol of butadiene with one mol of styrene, 14% by weight of a water-soluble protein-alkylolamine-urea-formaldehyde reaction product, 6% by weight of formaldehyde, 5% by weight of triethanolamine, 5% by weight of light mineral oil known as "Mineral Spirits" and 5% by weight of a heavy mineral oil known as "Bayol" were mixed with 61.5 parts by weight of a 2% aqueous solution of ammonium alginate and 1.5 parts by weight of "Tergitol #7" to form a printing paste. To this printing paste there were taken added 3 parts by weight of W. D. Phthalocyanine Blue B 61-(Harmon).

This pigment-containing printing paste was then printed on a glass fabric. The printed fabric was dried for two to three minutes at 290° F., passed through a 5% chromic acid bath at 190° F., rinsed and dried.

The printed fabric was found to be flexible and to have excellent wash and crock fastness.

Example 2

The method of Example 1 was repeated, the after-treatment, however, being carried out with a 2% solution of chromic acetate instead of with chromic acid.

The results were substantially the same as in Example 1.

*Example 3*

The method of Example 1 was repeated, the 61.5 parts by weight of ammonium alginate solution of sodium alginate and 5 parts by weight of a 2% solution of sodium alginate and 5 parts by weight of "Tergitol #7" being used instead of 1.5 parts by weight. One portion of the printed fabric was after-treated with a 2% solution of chromic acetate instead of with chromic acid and another portion was after-treated with a 4% solution of chromic acetate.

It was found that the prints thus obtained had increased penetration and were entirely fast to laundering at 160° F.

*Example 4*

Example 1 was repeated, the parts by weight of ammonium alginate solution and "Tergitol #7," however, being changed to 58 and 2 parts by weight, respectively. The after-treatment was carried out with a 5% solution of aluminum subacetate (basic).

It was found that the wash fastness and crock fastness of the print thus obtained were good but slightly inferior to those of the prints obtained in accordance with Examples 1, 2 and 3.

While but a few examples of the invention have been shown, it is clear that innumerable changes in the relative proportions and variations in the components of the printing paste, as well as variations in the procedure of applying and after-treating said printing paste can readily be developed by those skilled in the art by reading this description. All such changes and modifications are intended to be inclined within the scope of the invention as defined in the appended claims.

We claim:

1. A method of applying a pigment color to a glass fabric which comprises applying to the material a printing paste containing a pigment color, a pigment binder comprising from about 10% to about 50% by weight of an aqueous dispersion containing from a few to about 60% by weight of a resin selected from the group consisting of vinyl chloride polymers, vinylidene chloride polymers and vinyl-vinylidene chloride copolymers, said resin being in solid, dispersed form, from about 5% to about 40% by weight of an unvulcanized latex comprising a synthetic rubbery polymer of a butadiene hydrocarbon and containing from about 30% to 70% by weight of solids, and a water-soluble thermosetting urea-formaldehyde containing resin in an amount from about 5% to about 25% by weight; and from about 50 to 85% by weight of a dilute aqueous solution of a water-soluble alginate, the concentration of alginate in said dilute aqueous solution being of the order of about 2%; drying the printed material, and after-treating said printed and dried material with an aqueous solution of a water-soluble metal compound selected from the group consisting of chromic acid, chromic acetate and aluminum subacetate.

2. The method defined in claim 1 wherein the after-treatment is carried out with dilute chromic acid.

3. The method defined in claim 1 wherein the after-treatment is carried out with a dilute aqueous solution of chromic acetate.

4. The method defined in claim 1 wherein the after-treatment is carried out with a dilute aqueous solution of aluminum subacetate.

FRED G. LA PIANA.
GEORGE N. HOUTH.

References Cited in the file of this patent

UNITED STATES PATENTS

| Number | Name | Date |
|---|---|---|
| 2,275,991 | Powers et al. | Mar. 10, 1942 |
| 2,290,633 | Cate | July 21, 1942 |
| 2,364,738 | Marberg et al. | Dec. 12, 1944 |
| 2,450,902 | Marberg | Oct. 12, 1948 |
| 2,511,113 | La Piana | June 13, 1950 |